(12) United States Patent  
Sasaki

(10) Patent No.: US 9,471,530 B2  
(45) Date of Patent: Oct. 18, 2016

(54) SEMICONDUCTOR DEVICE AND MOBILE TERMINAL DEVICE

(71) Applicant: Renesas Electronics Corporation, Kawasaki-shi, Kanagaws (JP)

(72) Inventor: Satoshi Sasaki, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 14/798,194

(22) Filed: Jul. 13, 2015

(65) Prior Publication Data

US 2015/0317279 A1 Nov. 5, 2015

Related U.S. Application Data

(63) Continuation of application No. 13/767,095, filed on Feb. 14, 2013, now Pat. No. 9,111,043.

(30) Foreign Application Priority Data

Mar. 12, 2012 (JP) ................................ 2012-054406

(51) Int. Cl.
| | | |
|---|---|---|
| G06F 13/12 | (2006.01) | |
| G06F 13/42 | (2006.01) | |
| G06F 13/38 | (2006.01) | |
| G06F 13/40 | (2006.01) | |
| G06F 3/038 | (2013.01) | |

(52) U.S. Cl.  
CPC ......... *G06F 13/4282* (2013.01); *G06F 13/385* (2013.01); *G06F 13/4068* (2013.01); *G06F 3/0383* (2013.01)

(58) Field of Classification Search  
None  
See application file for complete search history.

(56) References Cited

U.S. PATENT DOCUMENTS

| | | |
|---|---|---|
| 2003/0023804 A1 | 1/2003 | Matsuda et al. |
| 2008/0155151 A1 | 6/2008 | Fifield et al. |
| 2009/0198859 A1* | 8/2009 | Orishko ............... G06F 13/385 710/313 |
| 2010/0205339 A1* | 8/2010 | Bohm ................... G06F 1/3203 710/106 |
| 2010/0208528 A1 | 8/2010 | Mizukane et al. |
| 2012/0311359 A1 | 12/2012 | Jaramillo |

FOREIGN PATENT DOCUMENTS

| | | |
|---|---|---|
| JP | 2002-318638 A | 10/2002 |
| JP | 2003-044186 A | 2/2003 |
| JP | 2007-242027 A | 9/2007 |
| JP | 2008-067346 A | 3/2008 |
| JP | 2010-192042 A | 2/2010 |
| JP | 2011-512577 A | 4/2011 |
| WO | WO 2011-133401 A1 | 10/2011 |

OTHER PUBLICATIONS

Office Action for related Japanese Patent Application No. 2012-054406, mailed May 12, 2015.

* cited by examiner

*Primary Examiner* — Henry Tsai  
*Assistant Examiner* — Aurangzeb Hassan  
(74) *Attorney, Agent, or Firm* — Shapiro, Gabor and Rosenberger, PLLC

(57) ABSTRACT

To provide a semiconductor device and a mobile terminal device capable of operating with stability. A semiconductor device includes an HSIC physical layer circuit fixedly connected to another semiconductor device through a bus line, a USB link control unit that operates with either a USB host function or a USB device function, and link-connects to the another semiconductor device, a nonvolatile storage unit that stores selection data, the selection data being used to select the USB function with which the USB link control unit operates, and a semiconductor substrate on which the HSCI physical control unit, the USB link control unit, and the nonvolatile storage unit are formed.

17 Claims, 10 Drawing Sheets

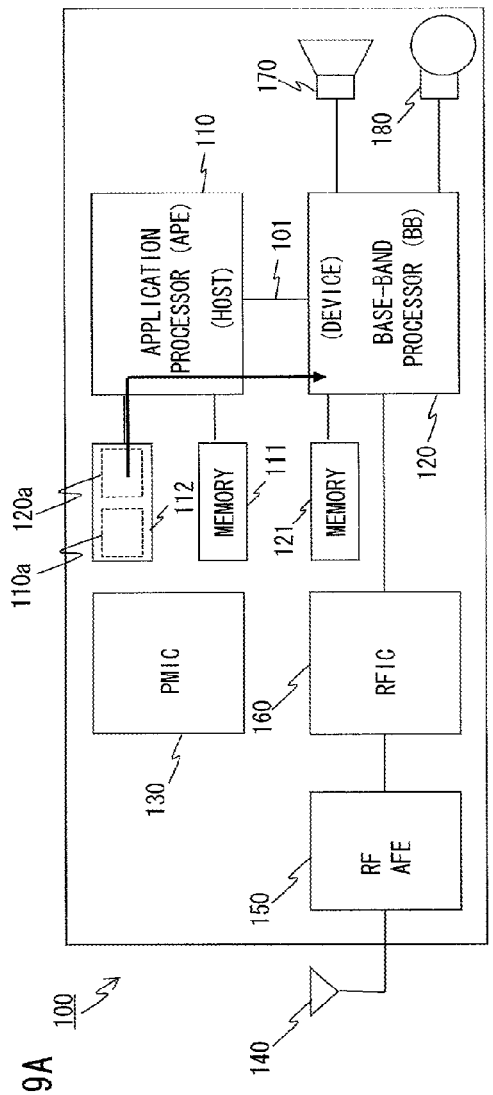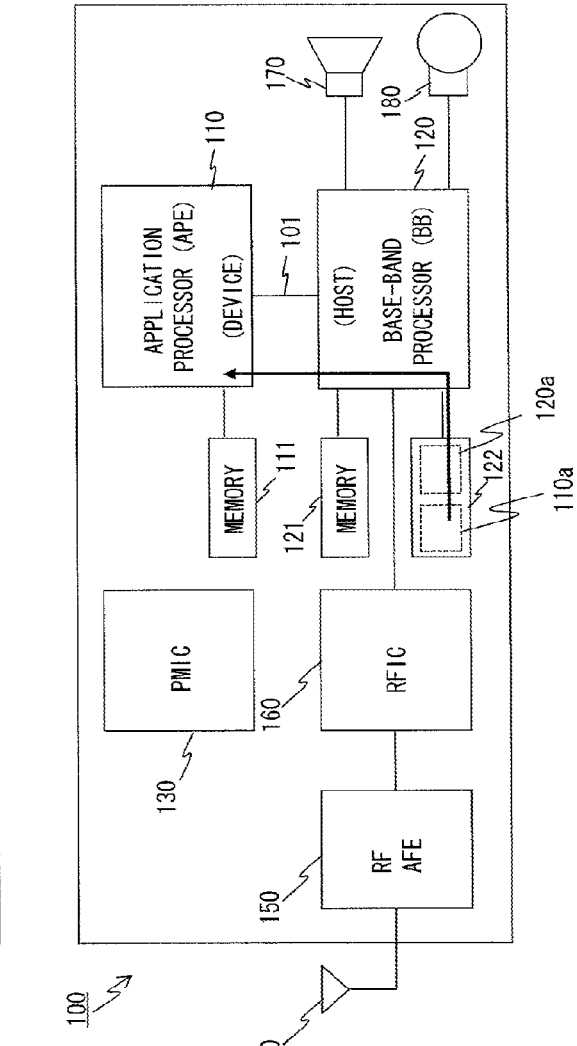

SEMICONDUCTOR DEVICE AND MOBILE TERMINAL DEVICE

CROSS-REFERENCE TO RELATED APPLICATIONS

This application is based upon and claims the benefit of priority from Japanese patent application No. 2012-054406, filed on Mar. 12, 2012, the disclosure of which is incorporated herein in its entirety by reference.

BACKGROUND

The present invention relates to a semiconductor device and a mobile terminal device. For example, the present invention can be suitably used for a semiconductor device and a mobile terminal device that operate with either a USB host function or a USB device function.

In recent years, USBs (Universal Serial Buses) have been widely used as interfaces for connections between electronic apparatuses. By using the USB, it is possible to connect a host unit (host equipment) having a host function with various device units (peripheral equipments or peripheral devices) having a device function. Further, since its transfer rate has also increased, they are used in a large number of apparatuses. Further, they are also beginning to be used inside electronic apparatuses as well as between electronic apparatuses. For example, HSICs (High Speed Inter Chips), which are used to fixedly connect one semiconductor device (semiconductor chip) to another semiconductor device, are standardized in the "USB2.0 high speed mode" of the USB standards.

Published Japanese Translation of PCT International Publication for Patent Application, No. 2011-512577 has been known as a literature on the HSIC like this.

SUMMARY

To connect one semiconductor device to another semiconductor device by using an HSIC like the one described above, it is necessary that one of the semiconductor devices operates as a host unit having a host function and the other semiconductor device operates as a device unit having a device function.

However, no specific method for selecting whether the semiconductor device should operate with a USB host function or with a USB device function is stipulated. Therefore, there is a problem in the related-art semiconductor devices that the operation could become unstable.

Other problems to be solved and novel features of the present invention will become obvious from the following descriptions of this specification and the attached drawings.

A first aspect of the present invention is a semiconductor device including: an HSIC physical layer circuit; a USB link control unit; and a nonvolatile storage unit, in which the HSIC physical layer circuit, the USB link control unit, and the nonvolatile storage unit are formed on a semiconductor substrate. Further, the HSIC physical layer circuit is fixedly connected to another semiconductor device through a bus line. The USB link control unit operates with either a USB host function or a USE device function, and link-connects to the another semiconductor device through the HSIC physical layer circuit. The nonvolatile storage unit is used to store selection data that is used to select the USB function with which the USE link control unit operates.

According to the first aspect of the present invention, it is possible to provide a semiconductor device and a mobile terminal device capable of operating with stability.

BRIEF DESCRIPTION OF THE DRAWINGS

The above and other aspects, advantages and features will be more apparent from the following description of certain embodiments taken in conjunction with the accompanying drawings, in which:

FIGS. 9A and 9B are diagrams for explaining an operation of a semiconductor device according to a first embodiment.

DETAILED DESCRIPTION

Outline of Embodiment

Figure 1:
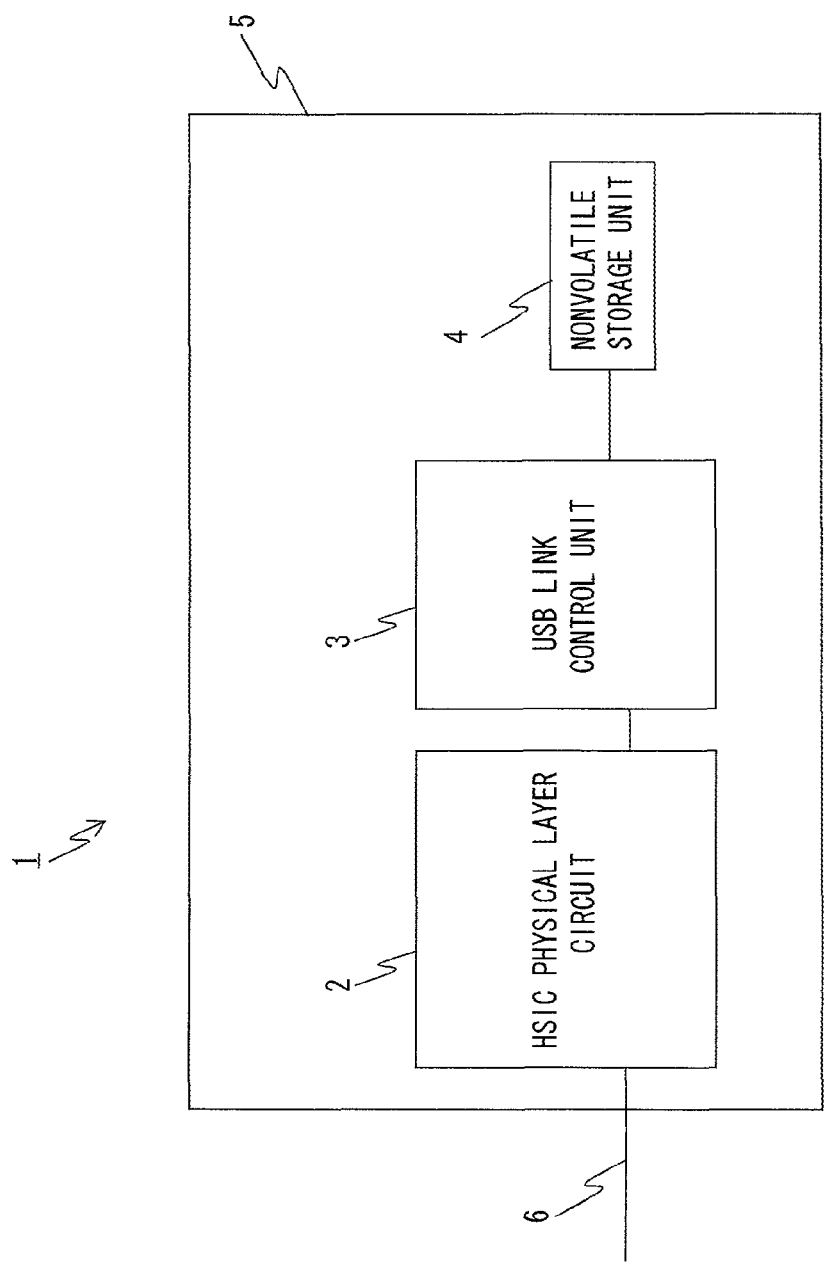
FIG. 1 is a configuration diagram showing main features of a semiconductor device according to an embodiment.

Firstly, an outline of an embodiment is explained with reference to FIG. 1. As shown in FIG. 1, a semiconductor device 1 according to an embodiment of the present invention includes an HSIC physical layer circuit 2, a USB link control unit 3, and a nonvolatile storage unit 4.

The HSIC physical layer circuit 2 is fixedly connected to another semiconductor device(s) (not shown) through a bus line 6, and controls an USB physical layer. The USE link control unit 3 operates with either a USB host function or a USE device function, and controls a link connection with another semiconductor device(s) through the HSIC physical layer circuit 2. The nonvolatile storage unit 4 stores selection data that is used to select the USE function with which the USB link control unit 3 operates. Further, the HSIC physical layer circuit 2, the USB link control unit 3, and the nonvolatile storage unit 4 are formed on a semiconductor substrate 5.

With the configuration like this, it is possible to set whether the semiconductor device operates with the USB host function or the USB device function by the nonvolatile storage unit, and thus enabling the semiconductor device to operate with stability at all times. For example, even at the time of the power-up and/or the reset state (or initialization), the semiconductor device can reliably operate with the set host function or the device function.

First Embodiment

A first embodiment is explained hereinafter with reference to the drawings.

Figure 2:
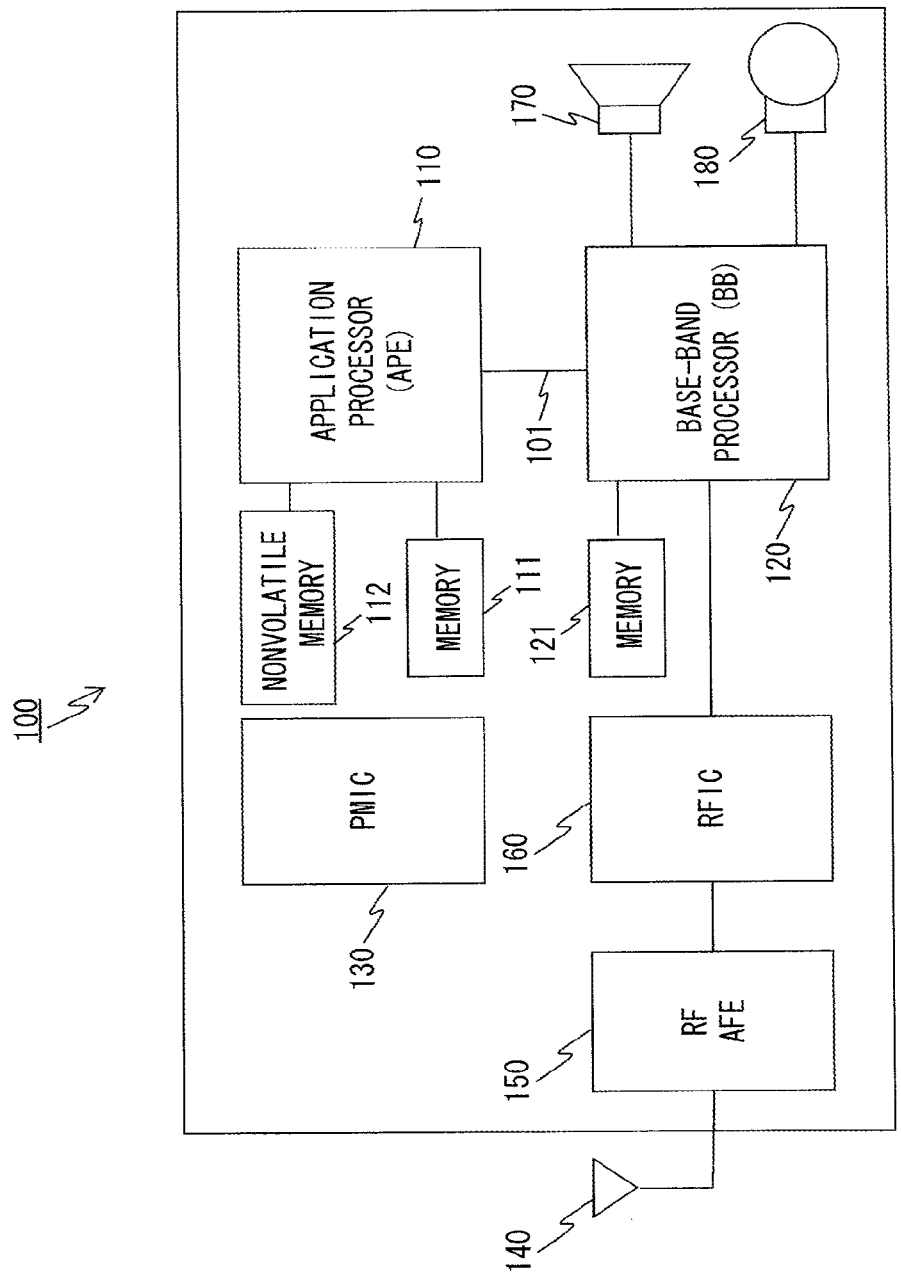
FIG. 2 is a configuration diagram showing a configuration of a mobile terminal device according to a first embodiment.

FIG. 2 shows a configuration of a mobile terminal device according to this embodiment of the present invention. A mobile terminal device 100 is, for example, a mobile terminal device such as a mobile phone, a smart phone, and a tablet terminal. The mobile terminal device 100 performs radio communication with a base station (not shown), and thereby connects with and performs data communication such as a telephone call with another mobile terminal device(s) through the base station.

As shown in FIG. 2, the mobile terminal device 100 is a terminal device having a multi-processor architecture, and includes an application processor (APE: Application Processor Engine) 110, a base-band processor (BB: Base Band processor) 120. Further, the mobile terminal device 100 also includes a memory 111 and a nonvolatile memory 112, and a memory 121 as storage devices for these processors. Further, the mobile terminal device 100 also includes a PMIC (Power Management IC) 130, an antenna 140, an RFAFE (Radio Frequency Analog Front End) 150, an RFIC (Radio Frequency IC) 160, a speaker 170, and a microphone 180.

Note that the mobile terminal device 100 also includes an input unit(s) such as a keyboard and a camera, a display unit(s) such as a liquid crystal display and a touch panel, and other components that are used to implement various functions necessary as a mobile phone, a smart phone, or the like.

The PMIC (Power Management IC) 130 is a power supply circuit that manages power supply to each components of the mobile terminal device 100. The microphone 180 is an input unit used to input voice (or sound) for a telephone call or the like, and the speaker 170 is an output unit used to output voice (or sound) for a telephone call or the like.

The RFAFE 150 and the RFIC 160 form an RF signal processing circuit, and thereby perform RF processing for an RF signal (Radio-Frequency signal) transmitted/received through the antenna 140. For example, the RFAFE 150 performs transmission signal amplification, transmission signal selection, and reception signal selection. Meanwhile, the RFIC 160 performs transmission signal up-conversion, transmission signal down-conversion, transmission data D/A conversion, and reception signal A/D conversion.

The application processor 110 is a semiconductor device that performs application processing such as video data (image data) compression/expansion. The base-band processor 120 is a semiconductor device that performs base-band processing such as radio data modulation/demodulation. Each of the application processor 110 and the base-band processor 120 is one-chip semiconductor device and they are connected with each other through an HSIC bus 101.

The nonvolatile memory 112 and the memory 111 are connected to the application processor 110. In the nonvolatile memory 112, programs that are executed by the application processor 110 or the base-band processor 120 are stored. As will be explained later, the nonvolatile memory 112 may be connected to the base-band processor 120. In the memory 111, application data such as video data processed by the application processor 110 is stored. For example, video data stored in the memory 111 is displayed in the display unit.

The memory 121, the speaker 170, and the microphone 180 are connected to the base-band processor 120. In the memory 121, base-band data such as voice data processed by the base-band processor 120 is stored.

To implement a telephone call function, when a voice signal is entered through the microphone 180, the base-band processor 120 encodes the voice signal and outputs the encoded voice data as transmission data to the RFIC 160. Further, when voice reception data is input from the RFIC 160, the base-band processor 120 decodes the reception data and outputs the decoded data as a voice signal to the speaker 170.

Further, to implement a data communication function for video data and the like, when video data is input from the application processor 110, the base-band processor 120 encodes the video data and outputs the encoded video data as transmission data to the RFIC 160. Further, when video reception data or the like is input from the RFIC 160, the base-band processor 120 decodes the reception data and outputs the decoded data as video data to the application processor 110.

To implement other application functions, for example, when a video signal is input from a camera or the like, the application processor 110 encodes the video signal and outputs the encoded video data to the memory 111 and/or the base-band processor 120. Further, when video data is input from the base-band processor 120, the application processor 110 decodes the video data and outputs the decoded video data as a video signal to the display unit.

Note that the application processor 110 is connected with the base-band processor 120 not only through the HSIC bus 101 but also through other buses (not shown). As will be explained later, mainly, programs that are executed by the application processor 110 or the base-band processor 120 are input/output through the HSIC bus 101. Other communication data and the like that are input/output between the application processor 110 and the base-band processor 120 may be input/output through either the HSIC bus 101 or the other buses. For example, the transfer rate of the HSIC bus 101 may be 480 Mbps. Therefore, data that needs to be transferred at around 480 Mbps may be transferred through the HSIC bus 101, whereas data that can be transferred at a rate lower than 480 Mbps may be transferred through other communication paths having a low transfer rate.

Figure 3:
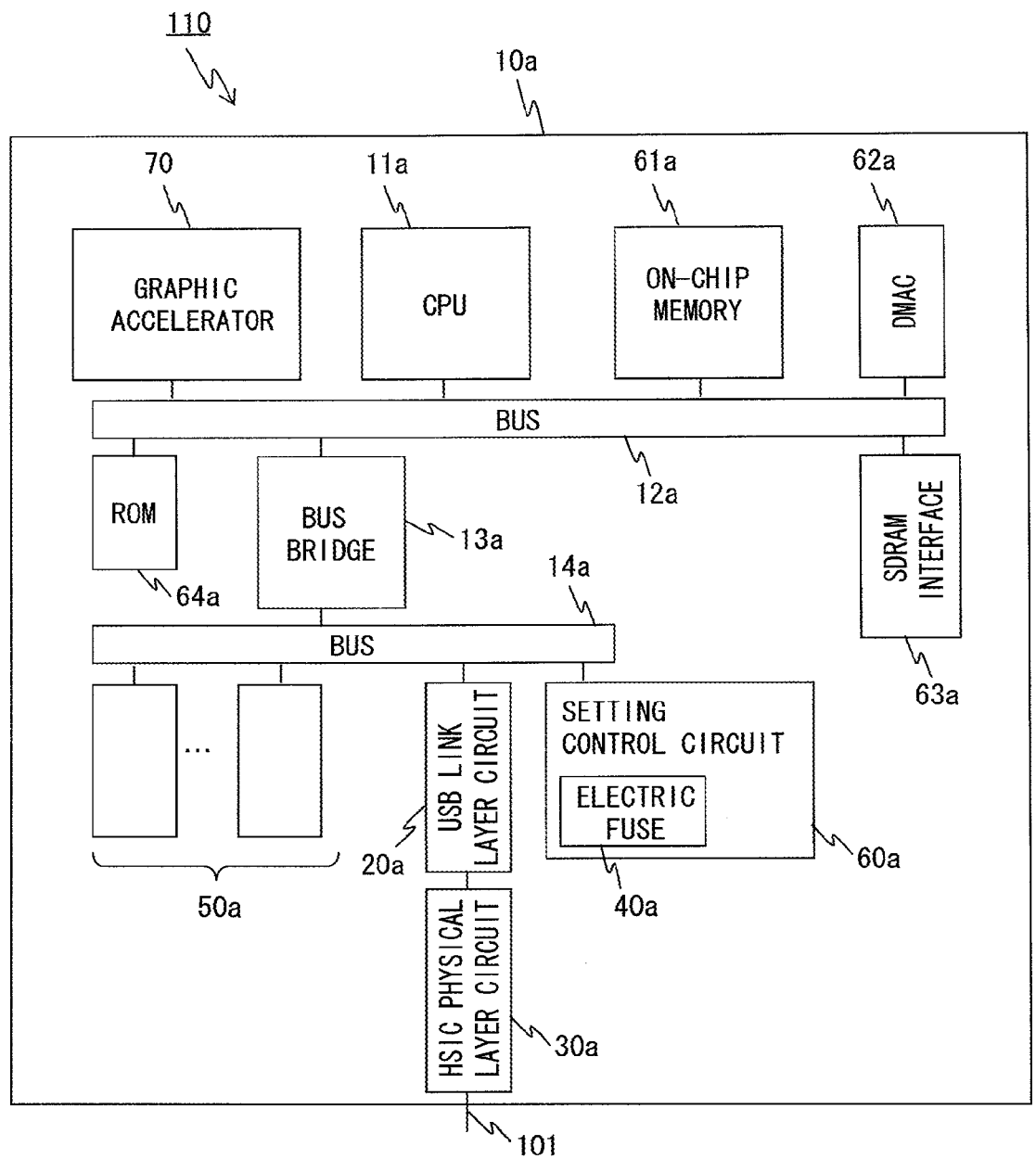
FIG. 3 is a configuration diagram showing a configuration of an application processor according to a first embodiment.
Figure 4:
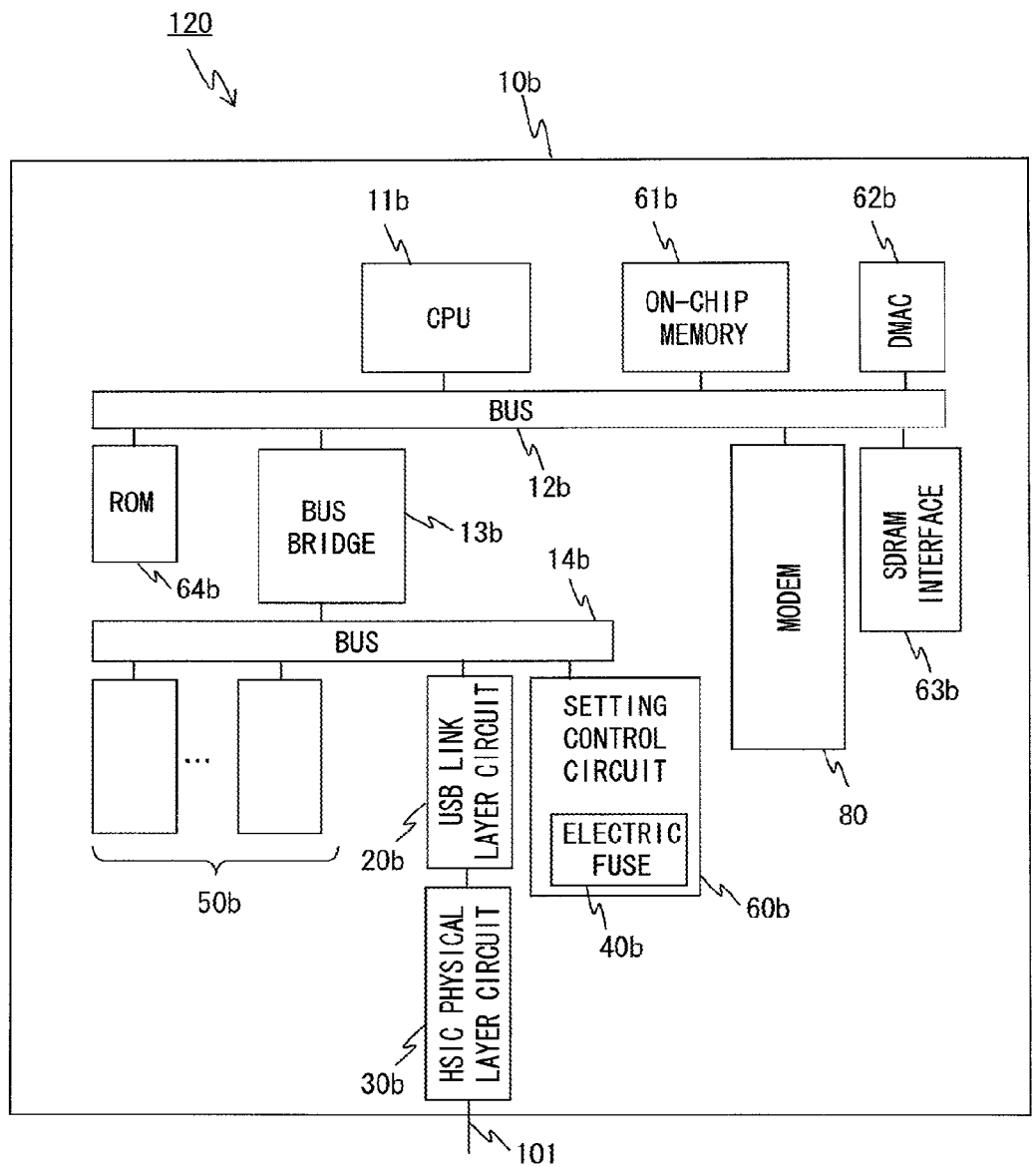
FIG. 4 is a configuration diagram showing a configuration of a base-band processor according to a first embodiment.

FIG. 3 shows a configuration of the application processor 110 according to this embodiment, and FIG. 4 shows a configuration of the base-band processor 120 according to this embodiment. Each of the application processor 110 and the base-band processor 120 is equipped with an HSIC as a peripheral circuit (interface).

Note that in FIGS. 3 and 4, a suffix "a" or "b" is added to the symbols of the common components between these processors. Note that the suffix "a" or "b" is not necessarily added to all the common components. Further, in particular, the suffix "a" is added to the symbols of components included in the application processor 110, and the suffix "b" is added to the symbols of components included in the base-band processor 120

As shown in FIGS. 3 and 4, each of the application processor 110 and the base-band processor 120 includes a CPU 11 (11a, 11b), a bus 12 (12a, 12b), a bus bridge 13 (13a, 13b), a bus 14 (14a, 14b), an USB link layer circuit 20 (20a, 20b), an HSIC physical layer circuit 30 (30a, 30b), a plurality of peripheral circuits 50 (50a, 50b), a setting control circuit 60 (60a, 60b) including an electric fuse 40 (40a, 40b), an on-chip memory 61 (61a, 61b), a DMAC (Direct Memory Access Controller) 62 (62a, 62b), an SDRAM interface 63 (63a, 63b), and a ROM 64 (64a, 64b).

Further, the application processor 110 includes a graphic accelerator 70, and the base-band processor 120 includes a modem 80. Further, these circuits are formed on a respective semiconductor substrate 10 (10a, 10b).

The CPU 11, the on-chip memory 61, the DMAC 62, the SDRAM interface 63, the ROM 64, and the graphic accelerator 70 or the modem 80 are connected with each other through the bus 12, which is a CPU bus. Further, the USB link layer circuit 20, the setting control circuit 60 including the electric fuse 40, and the peripheral circuits 50 are connected with each other through the bus 14, which is a peripheral bus. Further, the bus 12 and the bus 14 are connected with each other through the bus bridge 13. For example, the bus 12 is a high-speed bus and the bus 14 is a low-speed bus. Further, the bus bridge 13 enables signals to be exchanged between the CPU 11, which is connected to the high-speed bus, and the USB link layer circuit 20, which is connected to the low-speed bus.

The CPU 11 is a processing unit that executes arithmetic processing according to a program and thereby executes various processes. In the on-chip memory 61, which is a volatile memory, video data, voice data, and data necessary for arithmetic processing are stored. In the ROM 64, which is a nonvolatile memory, other data including setting data that needs to be retained even in the power-off state are stored.

The DMAC 62 enables direct memory access performed between the on-chip memory and one of the peripheral circuits or the like. The SDRAM interface 63 is an interface used to write/read data to/from an SDRAM. For example, the SDRAM interface 63 is an interface used for the connection with the memory 111 or the memory 121 shown in FIG. 2.

The HSIC physical layer circuit 30a of the application processor 110 and the HSIC physical layer circuit 30b of the base-band processor 120 are fixedly connected with each other through the HSIC bus 101 in a non-removable fashion, and perform physical layer control in accordance with the HSIC standards.

The USB link layer circuit 20a of the application processor 110 and the USE link layer circuit 20b of the base-band processor 120 are connected with each other through the HSIC physical layer circuit 30a, the HSIC bus 101, and the HSIC physical layer circuit 30b, and perform link layer control in accordance with the USE standards. The USB link layer circuit 20 can operates with either a host function or a device function.

The setting control circuit 60 is a circuit that performs various settings of the semiconductor device, i.e., various settings of the application processor 110 or the base-band processor 120. For example, the setting control circuit 60 performs settings for each circuit based on setting data stored in the ROM 64 and/or externally-supplied signals.

In particular, in this embodiment, the setting control circuit 60 includes the electric fuse 40, which can be electrically severed (i.e., programmable). The electric fuse 40 sets a host function or a device function for the USB link layer circuit 20 according to the severed state (programmed state) of the fuse. Even after the circuit is manufactured, the selection between the host function and the device function can be changed by rewriting the state of the electric fuse 40.

The peripheral circuits 50 are various peripheral circuits connected to the CPU through the bus. Necessary peripheral circuits are provided according to the functions of the semiconductor device. Examples of the peripheral circuits include a UART (Universal Asynchronous Receiver Transmitter), an I2C (Inter Integrated Circuit), and an interface with external devices disposed outside the semiconductor device.

The graphic accelerator 70 shown in FIG. 3 is a video (image) processing unit that performs video data (image data) compression/expansion and the like. For example, video data processed in the graphic accelerator 70 is stored into the memory 111 through the SDRAM interface 63. The modem 80 shown in FIG. 4 is a communication processing unit that performs modulation/demodulation processing of a digital signal input/output from/to the RFIC 160. For example, voice data processed in the modem 80 is stored into the memory 121 through the SDRAM interface 63.

Figure 5:
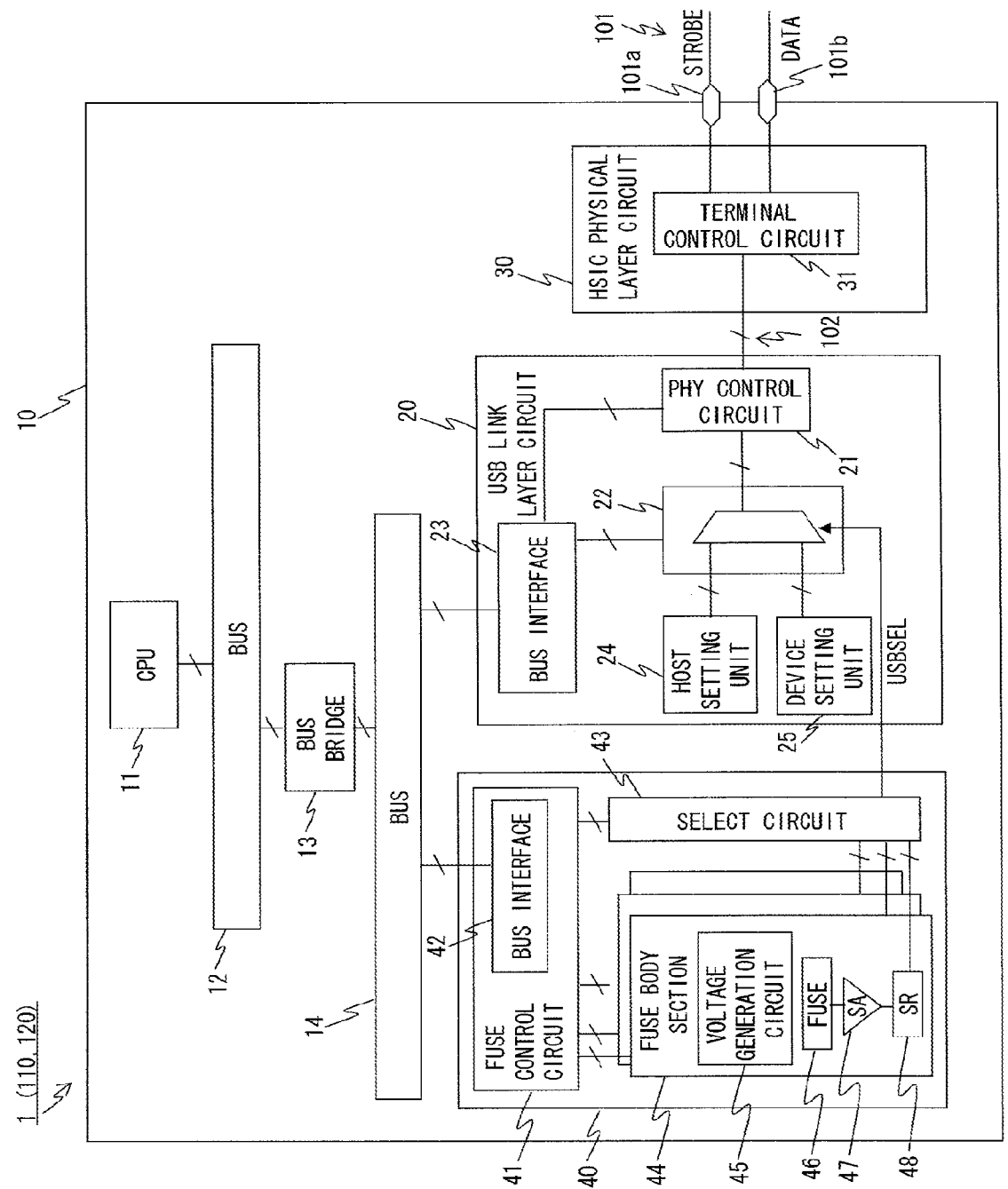
FIG. 5 is a configuration diagram showing a configuration of a semiconductor device according to a first embodiment.

FIG. 5 shows a more detailed configuration of the semiconductor device 1, i.e., the application processor 110 and the base-band processor 120 according to this embodiment. FIG. 5 shows part of the configuration of the semiconductor device 1, i.e., part of the common configuration between the application processor 110 shown in FIG. 3 and the base-band processor 120 shown in FIG. 4, and in particular, the configuration of the electric fuse 40, the USB link layer circuit 20, and HSIC physical layer circuit 30, and their connection relation.

As shown in FIG. 5, the USE link layer circuit 20 includes a physical (PHY) control circuit 21, a select circuit 22, a bus interface 23, a host setting unit 24, and a device setting unit 25.

The bus interface 23 receives data to be transmitted through the HSIC bus 101, from the CPU 11 or the like, and outputs data received through the HSIC bus 101, to the CPU 11 or the like. Further, the bus interface 23 may receive a select signal (USBSEL), which is used to select the host function or the device function, from the CPU 11 or the like, and output the received select signal to the select circuit 22.

The host setting unit 24 is a setting unit that sets the USB link layer circuit 20 and the HSIC physical layer circuit 30 so that they operate as a host function. The host setting unit 24 outputs a setting signal that is used to set the initial state (signal state in the start-up state) of a STROBE signal and a DATA signal of the HSIC physical layer so that they start to operate as a host function.

The device setting unit 25 is a setting unit that sets the USB link layer circuit 20 and the HSIC physical layer circuit 30 so that they start to operate as a device function. The device setting unit 25 outputs a setting signal that is used to set the initial state of the STROBE signal and the DATA signal of the HSIC physical layer so that they operate as a device function.

The select circuit 22 receives a select signal (USBSEL), which is used to select the host function or the device function, and selects the host function or the device function according to the USBSEL signal. By this selection, the select circuit 22 outputs the setting signal, which is output from the host setting unit 24 or the device setting unit 25 and used to set the host function or the device function, to the physical control circuit 21.

The physical control circuit 21 outputs the setting signal, which is output from the select circuit 22 and used to determine the initial state of the STROB signal and the DATA signal, to the HSIC physical layer circuit 30 through a UTMI bus 102. Further, the physical control circuit 21 also receives/outputs data that is transmitted/received to/from the bus interface 23 through the HSIC bus 101 and the UTMI bus 102.

The HSIC physical layer circuit 30 includes a terminal control circuit 31. The terminal control circuit 31 receives the setting signal through the UTMI bus 102 and outputs the STROBE signal and the DATA signal according to the setting signal. Further, the terminal control circuit 31 outputs data that is input by the STROBE signal and the DATA signal, to the USB link layer circuit 20 through the UTMI bus 102. The semiconductor device 1 includes a terminal 101a for the STROBE signal and a terminal 101b for the DATA signal, and the STROBE signal and the DATA signal are input/output from/to the HSIC physical layer circuit 30 (terminal control circuit 31) through the terminal 101a and the terminal 101b.

The electric fuse 40 includes a fuse control circuit 41, a bus interface 42, a select circuit 43, and a plurality of fuse body sections 44. Each of the fuse body sections 44 includes a voltage generation circuit 45, a fuse 46, a sense amplifier (SA) 47, and a shift register (SR) 48.

A select signal (address signal) that is used to select the fuse to be severed or to be read out is input from the CPU 11 or the like to the bus interface 42. The fuse control circuit 41 instructs the fuse body section 44 corresponding to the select signal and the select circuit 43 to sever or read out the fuse.

When the fuse is severed, the fuse body section 44 generates a severing voltage by using the voltage generation circuit 45 and applies the generated severing voltage to the fuse 46. Further, when the severed state of the fuse is read out, the fuse body section 44 generates a read voltage by using the voltage generation circuit 45 and applies the generated read voltage to the fuse 46.

In the fuse read-out process, the sense amplifier 47 and the shift register 48 detects a current flowing through the fuse 46 and amplifies the detected current. By doing so, they hold fuse data corresponding to the severed state of the fuse in the register and output the held fuse data. The select circuit 43 uses the fuse data (selection data) read out from the fuse body section 44 as the select signal (USBSEL) used to select the host function or the device function, and outputs the select signal (USBSEL) to the select circuit 22 of the USB link layer circuit 20.

Figure 6:
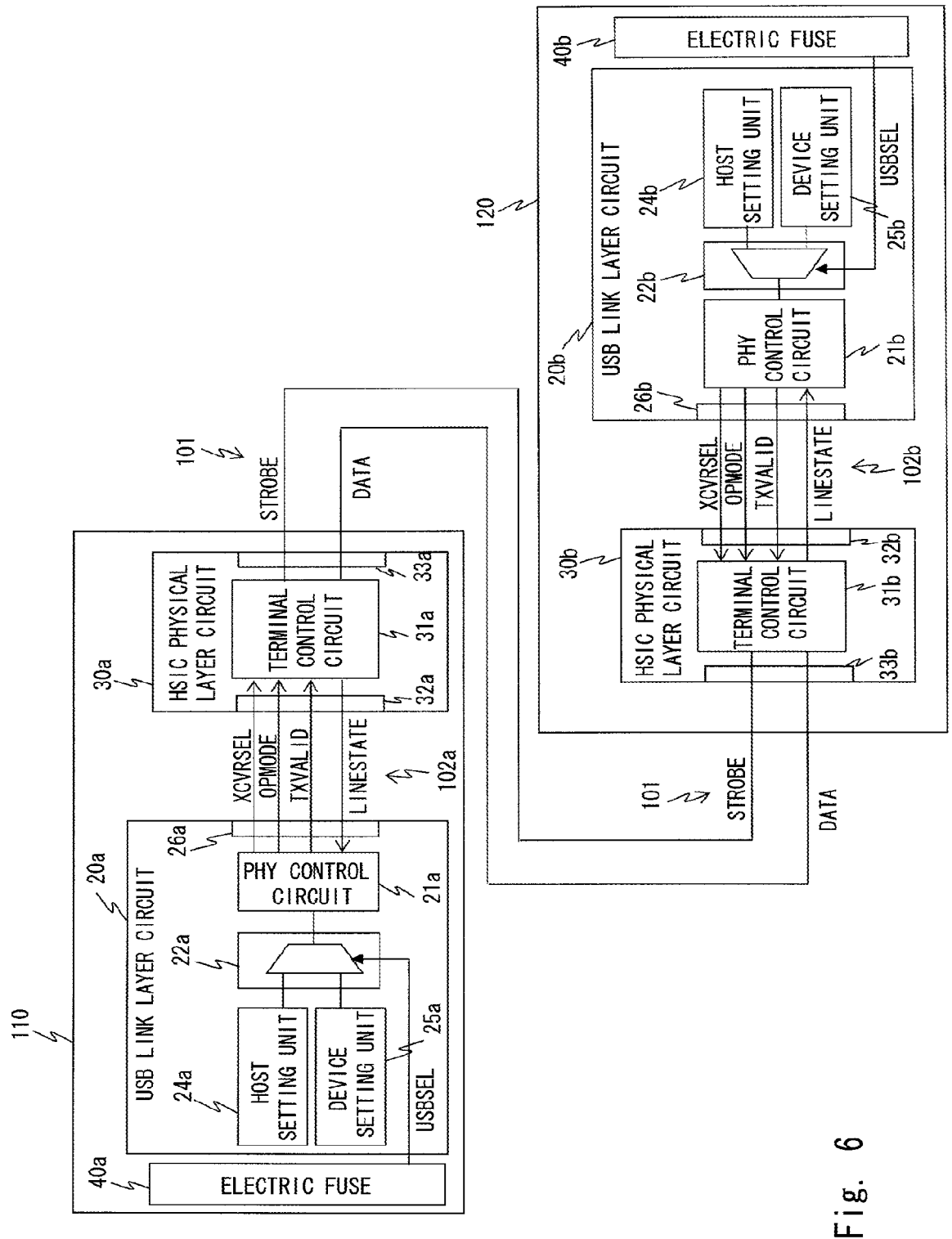
FIG. 6 is a configuration diagram showing a configuration of a semiconductor device according to a first embodiment.

Next, an operation of the application processor and the base-band processor according to this embodiment is explained. FIG. 6 shows a connection relation of signal lines of the UTMI bus and the HSIC bus, which are used to explain this operation.

As shown in FIG. 6, each of the application processor 110 and the base-band processor 120 includes the USB link layer circuit 20 (20a, 20b), the HSIC physical layer circuit 30 (30a, 30b), and the electric fuse 40 (40a, 40b) shown in FIG. 5.

The USB link layer circuit 20 and the HSIC physical layer circuit 30 are connected with each other through the UTMI bus 102 (102a, 102b). The USB link layer circuit 20 includes a UTMI interface 26 (26a, 26b) that is used for the connection through the UTMI bus 102, and the HSIC physical layer circuit 30 includes a UTMI interface 32 (32a, 32b) that is used for the connection through the UTMI bus 102.

The UTMI interface (UTMI bus) is an interface (bus) in conformity with the UTMI standards. For example, it is compatible with the UTMI+ standards specified in the "USB 2.0 Transceiver Macrocell Interface (UMTI) Specification". Further, it may be compatible with the ULPI (UMTI Low Pin Interface) standards in addition to or instead of the UTMI standards.

The UTMI bus 102 includes a plurality of input/output signals, and in this example, a part of them are illustrated. In the UTMI bus 102, an XCVRSEL signal, an OPMODE signal, and a TXVALID signal are output from the USB link layer circuit 20 to the HSIC physical layer circuit 30. Further, an LINESTATE is output from the HSIC physical layer circuit 30 to the USB link layer circuit 20.

The XCVRSEL signal is a select signal used by the USB link layer circuit 20 to select a transceiver for the HSIC physical layer circuit 30. The USB link layer circuit 20 sets an HS (Hi Speed) transceiver or an FS (Full Speed) transceiver according to the 1-bit XCVRSEL signal.

The OPMODE signal is a mode signal used by the USB link layer circuit 20 to set an operational mode for the HSIC physical layer circuit 30. The USB link layer circuit 20 sets a normal operation mode, a non-driving mode, or a disable mode (Disable bit stuffing and NRZI encoding) according to the 2-bit OPMODE signal.

The TXVALID signal is a flag signal used by the USB link layer circuit 20 to set a transmission flag for the HSIC physical layer circuit 30. The USE link layer circuit 20 sets the TXVALID signal when data is transmitted through a data bus (not shown) included in the UTMI bus.

The LINESTATE signal is a line state signal used by the HSIC physical layer circuit 30 to notify the USB link layer circuit 20 of the current line state of the HSIC bus. The HSIC physical layer circuit 30 notifies SE0 (single ended 0), a J-state, a K-state, or SE1 (single ended 1) by using the 2-bit LINESTATE signal.

The HSIC physical layer circuit 30 includes an HSIC interface 33 (33a, 33b) that is used for the connection through the HSIC bus 101. The HSIC interface (HSIC bus) is an interface (bus) in conformity with the HSIC standards. For example, it conforms to the "High-Speed Inter-Chip USB Electrical Specification version 1.0".

The STROBE signal and the DATA signal included in the HSIC bus 101 are bidirectionally input/output between the application processor 110 and the base-band processor 120. The DATA signal is a signal used to input/output data to be transmitted/received, and the STROBE signal is a timing signal that is output in synchronization with the data output by the DATA signal.

Further, in the HSIC bus, the signaling of the bus state is performed by using High/Low combinations of the STROBE signal and the DATA signal. Based on this bus state, the connection sequence (start-up sequence) that is performed in the start-up state (reset state (or initialization state)) upon power-up is implemented. For example, when the HSIC is enabled upon power-up, the signaling of an IDLE state is performed. After that, the signaling of a CONNECT state is performed.

Figure 7:
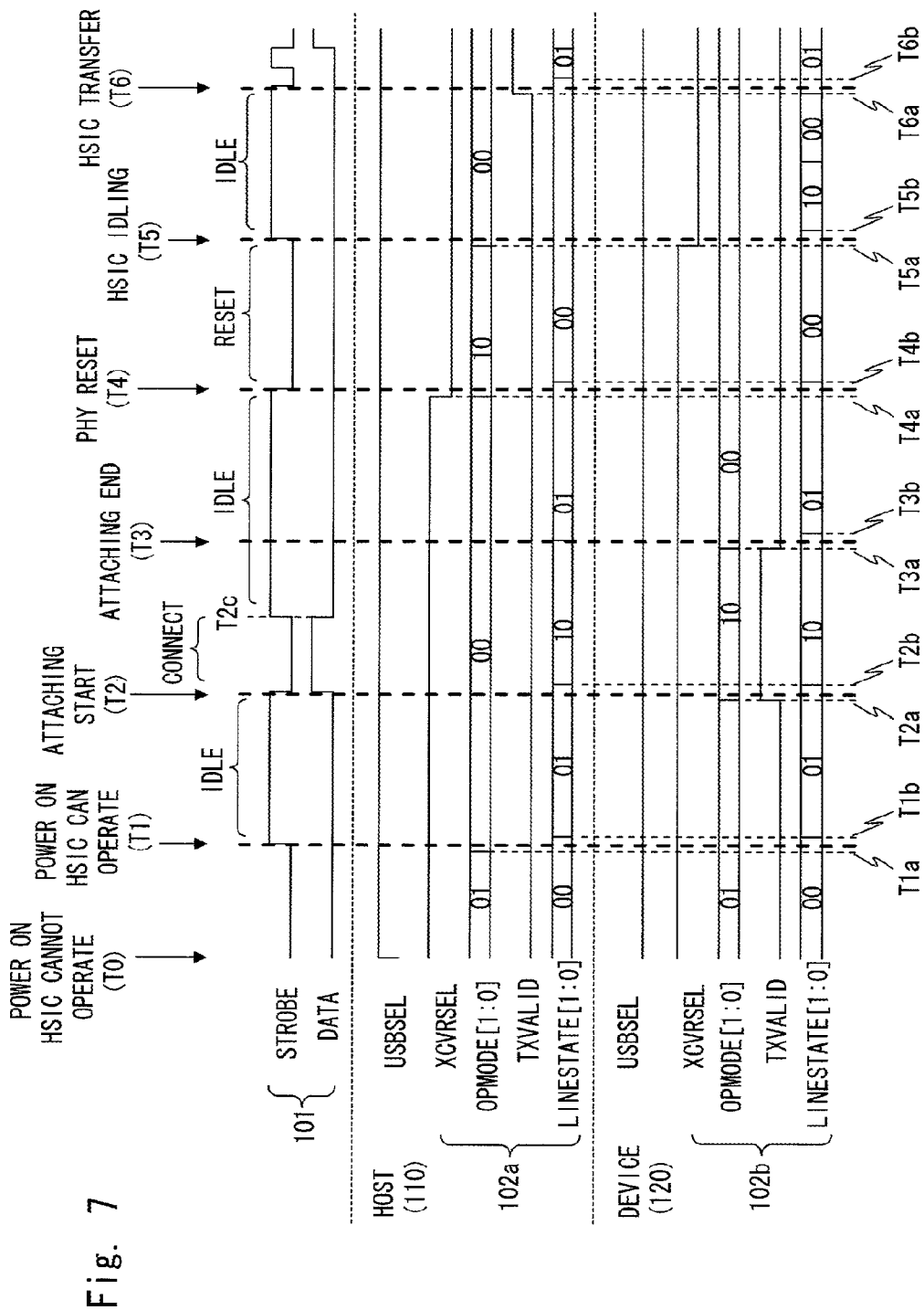
FIG. 7 is a timing chart showing an operation of a semiconductor device according to a first embodiment.

A timing chart shown in FIG. 7 shows a connection sequence (start-up sequence) performed in the start-up state (reset state) upon power-up in the application processor 110 and the base-band processor 120 shown in FIG. 6. That is, FIG. 7 shows each signal when the signaling is performed through the HSIC bus upon power-up and before the data transfer is performed. In this embodiment, an example in which the application processor 110 operates as a host function and the base-band processor 120 operates as a device function is explained.

Firstly, the HSIC physical layer circuits 30a and 30b are turned on (T0). Upon the power-up of the mobile terminal device 100, the application processor 110 and the base-band processor 120 are simultaneously turned on and electric power starts to be supplied to the HSIC physical layer circuits 30a and 30b. In this state, the HSIC physical layer circuits 30a and 30b cannot operate. At this point, since the HSIC physical layer circuits 30a and 30b are not in operation, the STROBE signal and the DATA signal are at a Low level in the HSIC bus 101.

Further, upon the power-up, the electric fuse 40 starts to operate immediately. As a result, since the application processor 110 operates as the host function, the electric fuse 40a starts to output a High ("1") level to the USBSEL signal according to the severed state. Further, since the base-band processor 120 operates as the device function, the electric fuse 40b starts to output a Low ("0") level to the USBSEL signal according to the severed state. Therefore, the select circuit 22a of the USB link layer circuit 20a selects the host setting unit 24a, and the select circuit 22b of the USB link layer circuit 20b selects the device setting unit 25b.

At this point, the XCVRSEL signal is set to the FS transceiver ("1") and the OPMODE signal is set to the non-driving mode ("01") by the host setting unit 24a in the UTMI bus 102a and by the device setting unit 25b in the UTMI bus 102b. Further, since the HSIC physical layer circuits 30a and 30b are not in operation, the LINESTATE signal is in the state SE0 ("00") in the UTMI buses 102a and 102b.

Next, the HSIC physical layer circuits 30a and 30b become an operable state (T1). Since the application processor 110 operates as the host function, the host setting unit 24a of the USB link layer circuit 20a sets the OPMODE signal of the UTMI bus 102a to the normal operation mode ("00") at a timing (T1a) immediately before the timing T1. For example, these signals are the setting signals that are set to operate the HSIC physical layer as the host function.

As a result, at the timing T1, the terminal control circuit 31a of the HSIC physical layer circuits 30a rises the STROBE signal of the HSIC bus 101 to a High level and thereby brings the HSIC bus 101 into the IDLE state (STROBE=High/DATA=Low). That is, the application processor 110, which operates as the host function, brings the HSIC bus 101 into the IDLE state. Since the STROBE signal becomes the High level, the HSIC physical layer circuits 30a and 30b bring the LINESTATE signal of the UTMI buses 102a and 102b into the J-state ("01") at a timing (T1b) immediately after the timing T1.

Next, the HSIC physical layer circuits 30a and 30b start "attaching". Since the base-band processor 120 operates as the device function, the device setting unit 25b of the USE link layer circuit 20b sets the OPMODE signal of the UTMI bus 102b to the disable mode ("10") and raises the TXVALID signal to a High level at a timing (T2a) immediately before the timing T2. For example, these signals are the setting signals that are set to operate the HSIC physical layer as the device function.

As a result, at the timing T2, the terminal control circuit 31b of the HSIC physical layer circuit 30b lowers the STROBE signal of the HSIC bus 101 to a Low level, raises the DATA signal to a High level, and thereby brings the HSIC bus 101 into the CONNECT state (STROBE=Low/DATA=High). That is, the base-band processor 120, which operates as the device function, brings the HSIC bus 101 into the CONNECT state. Since the STROBE signal becomes the Low level and the DATA signal becomes the High level, the HSIC physical layer circuits 30a and 30b bring the LINESTATE signal of the UTMI buses 102a and 102b into the K-state ("10") at a timing (T2b) immediately after the timing T2.

Further, after a predetermined period has elapsed, the terminal control circuit 31b of the HSIC physical layer circuit 30b raises the STROBE signal of the HSIC bus 101 to a High level and thereby returns the HSIC bus 101 to the IDLE state (STROBE-High/DATA-Low) (T2c). Note that at this point, enumeration is performed between the USB link layer circuit 20a (host function) and the USB link layer circuit 20b (device function) and thus the host function recognizes the unit (equipment) having the device function.

Next, the HSIC physical layer circuits 30a and 30b finish the attaching. At a timing (T3a) immediately before the timing T3, the device setting unit 25b of the USE link layer circuit 20b sets the OPMODE signal of the UTMI bus 102b to the normal operation mode ("00") and lowers the TXVALID signal to a Low level.

As a result, since the STROBE signal of the HSIC bus 101 is at the High level and the DATA signal is at the Low level, the terminal control circuit 31a of the HSIC physical layer circuit 30a brings the LINESTATE signal of the UTMI bus 102a to the J-state ("01") at the timing T3 and the terminal control circuit 31b of the HSIC physical layer circuit 30b brings the LINESTATE signal of the UTMI bus 102b to the J-state ("01") at a timing (T3b) immediately after the timing T3.

Next, the HSIC physical layer circuits 30a and 30b reset (or initialize) the physical layer (PHY) (T4). Since the application processor 110 operates as the host function, the host setting unit 24a of the USB link layer circuit 20a sets the XCVRSEL signal of the UTMI bus 102a to the HS transceiver ("0") and sets the OPMODE signal to the disable mode ("10") at a timing (T4a) immediately before the timing T4. For example, these signals are the setting signals that are set to operate the HSIC physical layer as the host function.

As a result, at the timing T4, the terminal control circuit 31a of the HSIC physical layer circuits 30a lowers the STROBE signal of the HSIC bus 101 to a Low level and thereby brings the HSIC bus 101 into the RESET state (STROBE=Low/DATA=Low). That is, the application processor 110, which operates as the host function, brings the HSIC bus 101 into the RESET state. Since the STROBE signal becomes the Low level and the DATA signal becomes the Low level, the HSIC physical layer circuits 30a and 30b bring the LINESTATE signal of the UTMI buses 102a and 102b into the state SED ("00") at a timing (T4b) immediately after the timing T4.

Next, the HSIC physical layer circuits 30a and 30b bring the HSIC into the idle state (T5). At a timing (T5a) immediately before the timing T5, the host setting unit 24a of the USB link layer circuit 20a sets the OPMODE signal of the UTMI bus 102a to the normal operation mode ("00") and the device setting unit 25b of the USB link layer circuit 20b sets the XCVRSEL signal of the UTMI bus 102b to the HS transceiver ("0").

As a result, the terminal control circuits 31a and 31b of the HSIC physical layer circuits 30a and 30b rise the STROBE signal of the HSIC bus 101 to a High level and thereby bring the HSIC bus 101 into the IDLE state (STROBE=High/DATA=Low) at the timing T5. Since the STROBE signal becomes the High level and the DATA signal becomes the Low level, the HSIC physical layer circuit 30b brings the LINESTATE signal of the UTMI bus 102b into the K-state ("10") at a timing (T5b) immediately after the timing T5. After that, the HSIC physical layer circuit 30b brings the LINESTATE signal into the state SE0 ("00") and then brings into the J-state ("01").

Next, the HSIC physical layer circuits 30a and 30b start the transfer for the HSIC (T6). At a timing (T6a) immediately before the timing T6, the host setting unit 24a of the USB link layer circuit 20a rises the TXVALID signal of the UTMI bus 102a to a High level.

As a result, the terminal control circuits 31a and 31b of the HSIC physical layer circuits 30a and 30b perform the data transfer by using the STROBE signal and the DATA signal of the HSIC bus 101 at the timing T6. Since the data transfer has been started, the HSIC physical layer circuits 30a and 30b bring the LINESTATE signal of the UTMI buses 102a and 102b into the J-state ("01") at a timing (T6b) immediately after the timing T6.

In this manner, the signaling is performed through the HSIC bus upon the power-up, and thereby enabling the data transfer to be performed. As shown in FIG. 7, when the connection is established through the HSIC bus, the device having the device function has to perform the attaching (signaling in the CONNECT state) at the timing T2 after the power is turned on. Then, the device having the host function has to perform the resetting (or initializing) (signaling in the RESET state) at the timing T4. Therefore, if it is not determined whether the semiconductor device should operate with a host function or a device function immediately after the power-up (at the end of the reset process (or initialization process)), the signaling such as the attaching and the resetting (or initializing) is not performed. Therefore, the handshaking is not properly performed, and thus making it impossible to connect the USB link.

For example, the host function/device function may be determined by using a register or the like. However, in such cases, there is a possibility that the signaling could not be properly performed because the state is not fixed immediately after the power-up. Further, the semiconductor device may be configured so as to have either the host function or the device function in a fixed manner. However, in such cases, it is impossible to select the function according to the purposed or the like of the semiconductor device after the semiconductor device is manufactured. Accordingly, in this embodiment according to the present invention, it is determined whether the semiconductor device operates with the host function or the device function immediately after the power-up according to the severed state of the electric fuse 40. Therefore, it is possible to reliably perform the signaling of the start-up sequence and thereby to establish an appropriate connection.

Figure 8A:
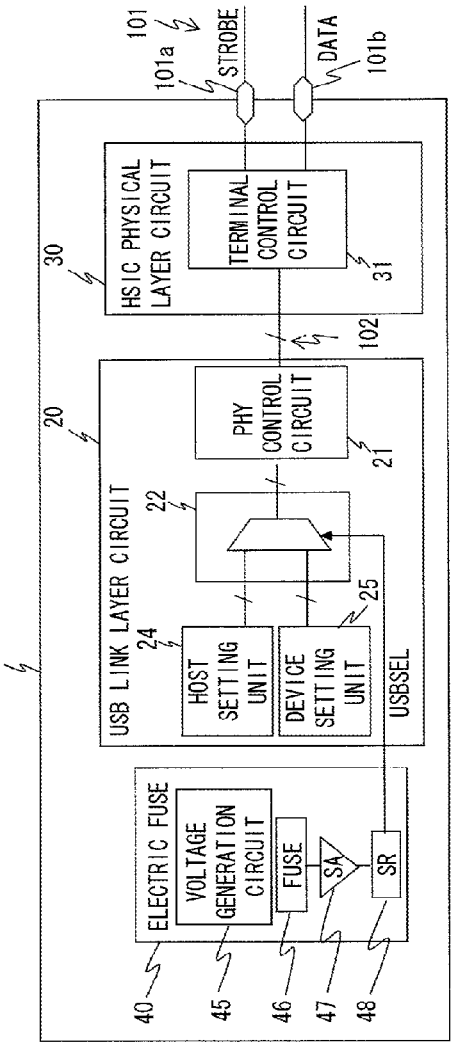
FIGS. 8A and 8B are diagrams for explaining advantageous effects of a semiconductor device according to a first embodiment.
Figure 8B:
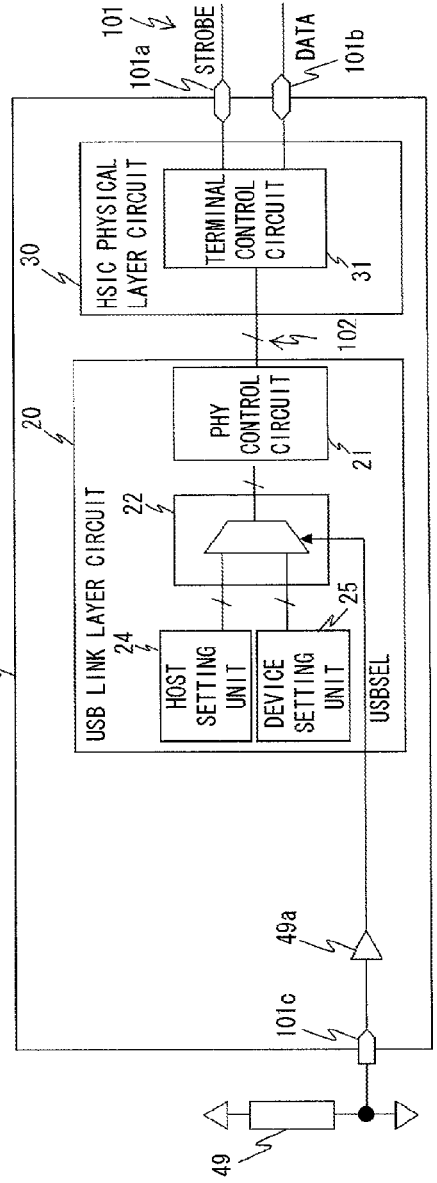

FIGS. 8A and 8B show the differences in configuration between when the semiconductor device includes a host/device select function inside the semiconductor device (FIG. 8A) and when the semiconductor device includes an external host/device select function (FIG. 8B).

In FIG. 8B, an external component 49 is disposed outside a semiconductor device 900 and is connected to an input terminal 101c of the semiconductor device 900. The external component 49 is a resistor or the like. A signal that is determined according to the resistance is input to the semiconductor device through the input terminal 101c and amplified by a buffer 49a. As a result, the USBSEL signal is generated. When the select function is externally disposed in this manner, there is a problem that the semiconductor device requires an additional input terminal for the selection. As the manufacturing process is becoming finer and finer in recent years, the number of functions incorporated into one semiconductor device is increasing. Therefore, it is very difficult to provide an additional terminal for selecting the host/device function. Further, in such cases, there is another problem that the manufacturing cost increases because the semiconductor device requires an additional external component(s) such as a resistor disposed outside the semiconductor device.

Accordingly, in this embodiment according to the present invention, the semiconductor device includes the host/device select function inside the semiconductor device as shown in FIG. 8A. As described above, the semiconductor device 1 according to this embodiment includes the electric fuse 40 inside the semiconductor device and has such a configuration that the USBSEL signal is generated according to the severed state of the fuse and the host function/device function is selected according to the USBSEL signal. In this manner, there is no need to provide the input terminal for the selection like the one shown in FIG. 8B, and thereby making it possible to reduce the number of terminals of the semiconductor device. Further, the manufacturing cost can be also reduced because there is no need to provide the external component such as a resistor.

FIGS. 9A and 9B show a state where the application processor 110 and the base-band processor 120 are switched to the host function or the device function as described above in the mobile terminal device 100 according to this embodiment.

FIG. 9A is an example in which the application processor 110 operates as the host function and the base-band processor 120 operates as the device function. In FIG. 9A, the nonvolatile memory 112 is connected to the application processor 110. In the nonvolatile memory 112, a start-up program 110a for the application processor 110 and a start-up program 120a for the base-band processor 120 are stored.

Further, the electric fuse 40a of the application processor 110 is set so that the host function is selected, and the electric fuse 40b of the base-band processor 120 is set so that the device function is selected. When the mobile terminal device 100 is turned on, the USE link layer circuit 20a and the HSIC physical layer circuit 30a of the application processor 110 operate as the host function, while the USB link layer circuit 20b and the HSIC physical layer circuit 30b of the base-band processor 120 operate as the device function as shown in FIG. 7.

As a result, the application processor 110 on the host function side becomes a started-up state by reading out the start-up program 110a for the application processor 110 from the nonvolatile memory 112 and executing the start-up program 110a. Further, the application processor 110 reads out the start-up program 120a for the base-band processor 120 from the nonvolatile memory 112 and outputs the read start-up program 120a to the base-band processor 120 through the HSIC bus 101. The base-band processor 120 becomes a started-up state by downloading the start-up program 120a through the HSIC bus 101 and executing the start-up program 120a. In this case, in order to transfer the start-up program from the host unit to the device unit, the application processor 110 is operates as the host function and the base-band processor 120 is operated as the device function.

When the number of functions of the application processor 110 is large and the size of the start-up program 110a of the application processor 110 is larger than that of the start-up program 120a of the base-band processor 120, the nonvolatile memory 112, which stores the start-up programs, may be disposed on the application processor 110 side so that the time necessary for transferring the program as well as the time necessary for starting up the application processor 110 may be reduced.

FIG. 9B is an example in which the base-band processor 120 operates as the host function and the application processor 110 operates as the device function. In FIG. 9B, the nonvolatile memory 122 is connected to the base-band processor 120. In the nonvolatile memory 122, a start-up program 110a for the application processor 110 and a start-up program 120a for the base-band processor 120 are stored.

Further, the electric fuse 40a of the application processor 110 is set so that the device function is selected, and the electric fuse 40b of the base-band processor 120 is set so that the host function is selected. When the mobile terminal device 100 is turned on, the USB link layer circuit 20a and the HSIC physical layer circuit 30a of the application processor 110 operate as the device function, while the USE link layer circuit 20b and the HSIC physical layer circuit 30b of the base-band processor 120 operate as the host function as shown in FIG. 7.

As a result, the base-band processor 120 on the host function side becomes a started-up state by reading out the start-up program 120a for the base-band processor 120 from the nonvolatile memory 122 and executing the start-up program 120a. Further, the base-band processor 120 reads out the start-up program 110a for the application processor 110 from the nonvolatile memory 122 and outputs the read start-up program 110a to the application processor 110 through the HSIC bus 101. The application processor 110 becomes a started-up state by downloading the start-up program 110a through the HSIC bus 101 and executing the start-up program 110a. In this case, in order to transfer the start-up program from the host unit to the device unit, the base-band processor 120 is operated as the host function and the application processor 110 is operated as the device function.

When the number of functions of the base-band processor 120 is large and the size of the start-up program 120a of the base-band processor 120 is larger than that of the start-up program 110a of the application processor 110, the nonvolatile memory 122, which stores the start-up programs, may be disposed on the base-band processor 120 side so that the time necessary for transferring the program as well as the time necessary for starting up the base-band processor 120 may be reduced.

As has been described above, this embodiment according to the present invention is configured in such a manner that an electric fuse is provided as the nonvolatile storage unit in a semiconductor device such as an application processor and a base-band processor, and the USB host function/USB device function with which the semiconductor device operates is set according to the severed state of the electric fuse. In this manner, it is possible to select the host function/device function after the circuit is manufactured. Further, the states of the STROB signal and the DATA signal are different between the host function and the device function in the start-up sequence that is performed upon power-up. Therefore, by fixing the host function or the device function by the electric fuse immediately after the power-up, it is possible to operate the semiconductor device with stability in the power-up state. Therefore, it is possible to reliably establish the connection through the HSIC bus in the power-up state.

Second Embodiment

A second embodiment is explained hereinafter with reference to the drawings. In the first embodiment, an example in a semiconductor device in which the host function/device function is selected by using an electric fuse is explained. In this embodiment according to the present invention, a configuration in which the host function/device function is selected by using a nonvolatile memory is explained. Note that the configurations other than the configuration for selecting the host function/device function are similar to those of the first embodiment.

Figure 10:
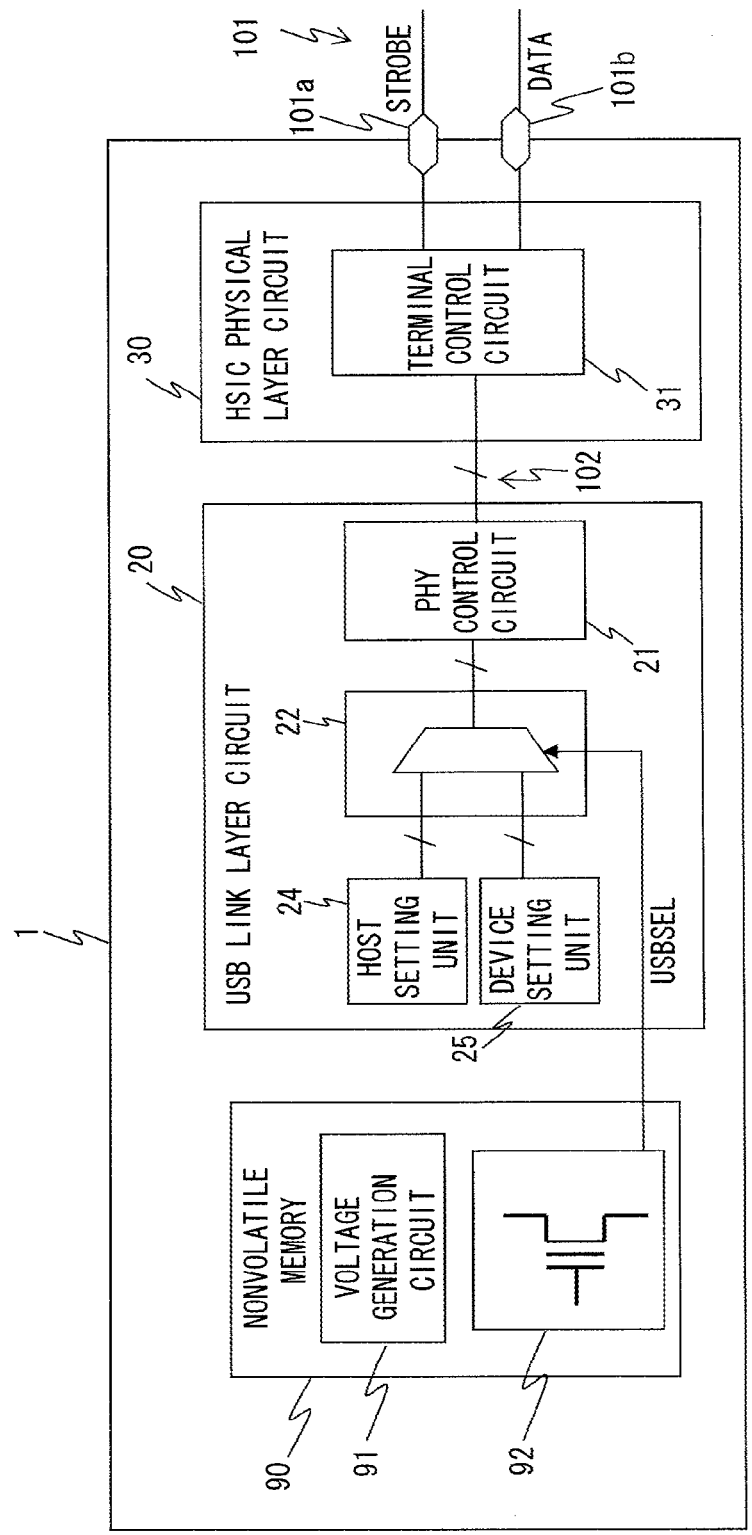
FIG. 10 a configuration diagram showing a configuration of a semiconductor device according to a second embodiment.

FIG. 10 shows a configuration of a semiconductor device 1 according to this embodiment of the present invention. In this semiconductor device 1, a nonvolatile memory 90 is provided in place of the electric fuse 40 of the first embodiment. Examples of the nonvolatile memory 90 include a flash memory, a FRAM (registered trademark), an MRAM.

As shown in FIG. 10, the nonvolatile memory 90 includes a voltage generation circuit 91 and a memory cell 92. When selection data that is used to select the host function/device function is supplied from the CPU 11 or the like, the voltage generation circuit 91 generates a write voltage and applies the generated write voltage to the memory cell 92. As a result the selection data is written into the memory cell 92. Further, when the selection data is read, a read voltage is applied to the memory cell 92 by the voltage generation circuit 91. Then, the USBSEL signal is output according to the read selection data.

In this manner, even when a nonvolatile is provided in place of the electric fuse used in the first embodiment, the host function/device function can be selected in a similar manner, and thereby enabling the semiconductor device to connect and operate with stability even in the power-up state. Further, since the nonvolatile memory can be rewritten again and again, a user or the like can arbitrarily change the function.

So far, the present invention, which has been made by the inventors of the present application, has been explained in a concrete manner based on the embodiments. However, the present invention is not limited to those embodiments, and needless to say, various modifications can be made to those embodiments without departing from the spirit and scope of the present invention.

For example, although examples of a mobile terminal device equipped with a semiconductor device have been explained in the above-described embodiments, the present invention can be applied to other electronic devices and the likes equipped with the above-described semiconductor device. Further, although the application processor and the base-band processor have been explained as an example of the semiconductor device, the present invention can be applied to other semiconductor devices that are connected by the HSIC bus.

The first and second embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
    an HSIC physical layer circuit fixedly connected to another semiconductor device through a bus line;
    a USB link control unit that operates with a USB function of either a host function or a device function, and link-connects to the another semiconductor device through the HSIC physical layer circuit;
    a nonvolatile storage unit that stores selection data, the selection data being used to select the USB function with which the USB link control unit operates; and a semiconductor substrate on which the HSIC physical layer circuit, the USB link control unit, and the nonvolatile storage unit are formed, wherein the USB link control unit comprises a host setting unit that generates a setting signal used for an operation as the host function;

a device setting unit that generates a setting signal used for an operation as the device function; and a select unit that outputs the setting signal generated by the host setting unit or the setting signal generated by the device setting unit according to the selection data, wherein the bus line includes a STROBE signal line and a DATA signal line, wherein the HSIC physical layer circuit controls an initial state of the STROBE signal line and the DATA signal line according to the setting signal output from the USB link control unit, wherein, when the HSIC physical layer circuit operates as the host function according to the setting signal output from the USB link control unit, the HSIC physical layer circuit brings the STROBE signal line and the DATA signal line into an IDLE state when the semiconductor device is started up, and wherein, when the HSIC physical layer circuit operates as the device function according to the setting signal output from the USB link control unit, the HSIC physical layer circuit brings the STROBE signal line and the DATA signal line into a CONNECT state after the STROBE signal line and the DATA signal line are brought by the another semiconductor device operating as the host function into the IDLE state.

2. The semiconductor device according to claim 1, wherein when the HSIC physical layer circuit operates as the host function according to the setting signal output from the USB link control unit, the HSIC physical layer circuit brings the STROBE signal line and the DATA signal line into a RESET state after the STROBE signal line and the DATA signal line are brought by the another semiconductor device operating as the device function into the CONNECT state.

3. The semiconductor device according to claim 1, wherein the nonvolatile storage unit is an electric fuse.

4. The semiconductor device according to claim 1, wherein the nonvolatile storage unit is a nonvolatile memory.

5. The semiconductor device according to claim 1, further comprising:

a memory that stores a program to be executed by the another semiconductor device, wherein when the USB link control unit operates as the host function according to the selection data, the program stored in the memory is transferred to the another semiconductor device via the bus line.

6. A mobile terminal device comprising:

an application processor that executes an application process; and a base-band processor that executes a base-band process, the base-band processor being fixedly connected to the application processor through a bus line, wherein each of the application processor and the base-band processor comprises:

an HSIC physical layer circuit fixedly connected to the bus line;

a USB link control unit that operates with a USB function of either a host function or a device function, and link-connects to the application processor or the base-band processor through the HSIC physical layer circuit;

a nonvolatile storage unit that stores selection data, the selection data being used to select the USB function with which the USB link control unit operates; and a semiconductor substrate on which the HSIC physical layer circuit, the USB link control unit, and the nonvolatile storage unit are formed, wherein the USB link control unit comprises:

a host setting unit that generates a setting signal used for an operation as the host function;

a device setting unit that generates a setting signal used for an operation as the device function; and a select unit that outputs the setting signal generated by the host setting unit or the setting signal generated by the device setting unit according to the selection data, wherein the bus line includes a STROBE signal line and a DATA signal line, wherein the HSIC physical layer circuit controls an initial state of the STROBE signal line and the DATA signal line according to the setting signal output from the USB link control unit, wherein, when the HSIC physical layer circuit operates as the host function according to the setting signal output from the USB link control unit, the HSIC physical layer circuit brings the STROBE signal line and the DATA signal line into an IDLE state when the device is started up, and wherein, when the HSIC physical layer circuit operates as the device function according to the setting signal output from the USB link control unit, the HSIC physical layer circuit brings the STROBE signal line and the DATA signal line into a CONNECT state after the STROBE signal line and the DATA signal line are brought by another HSIC physical layer circuit operating as the host function into the IDLE state.

7. The mobile terminal device according to claim 6, wherein when the HSIC physical layer circuit operates as the host function according to the setting signal output from the USB link control unit, the HSIC physical layer circuit brings the STROBE signal line and the DATA signal line into a RESET state after the STROBE signal line and the DATA signal line are brought by another HSIC physical layer circuit operating as the device function into the CONNECT state.

8. The mobile terminal device according to claim 6, wherein the nonvolatile storage unit is an electric fuse.

9. The mobile terminal device according to claim 6, wherein the nonvolatile storage unit is a nonvolatile memory.

10. A mobile terminal device comprising:

an application processor that executes an application process; and a base-band processor that executes a base-band process, the base-band processor being fixedly connected to the application processor through a bus line, wherein each of the application processor and the base-band processor comprises:

an HSIC physical layer circuit fixedly connected to the bus line;

a USB link control unit that operates with a USB function of either a host function or a device function, and link-connects to the application processor or the base-band processor through the HSIC physical layer circuit;

a nonvolatile storage unit that stores selection data, the selection data being used to select the USB function with which the USB link control unit operates; and a semiconductor substrate on which the HSIC physical layer circuit, the USB link control unit, and the nonvolatile storage unit are formed, wherein the USB link control unit comprises:

a host setting unit that generates a setting signal used for an operation as the host function;

a device setting unit that generates a setting signal used for an operation as the device function; and a select unit that outputs the setting signal generated by the host setting unit or the setting signal generated by the device setting unit according to the selection data, wherein the bus line includes a STROBE signal line and a DATA signal line, wherein the HSIC physical layer circuit controls an initial state of the STROBE signal line and the DATA signal line according to the setting signal output from the USB link control unit, wherein, when the HSIC physical layer circuit operates as the host function according to the setting signal, the HSIC physical layer circuit brings the STROBE signal line and the DATA signal line into an IDLE state when the device is started up, and wherein, when the HSIC physical layer circuit operates as the device function according to the setting signal, the HSIC physical layer circuit brings the STROBE signal line and the DATA signal line into a CONNECT state after the STROBE signal line and the DATA signal line are brought into the IDLE state, wherein the application processor or the base-band processor comprises a memory that stores a program to be executed in the application processor or the base-band processor, and wherein, when the USB link control unit operates as the host function according to the selection data, a program stored in the memory is transferred to the application processor or the base-band processor.

11. The mobile terminal device according to claim 6, wherein one of the application processor and the base-band processor comprises a memory that stores a program to be executed by the other of the application processor and the base-band processor, and when the USB link control unit of said one of the application processor and the base-band processor operates as the host function according to the selection data, the program stored in said memory is transferred to the other of the application processor and the base-band processor via the bus line.

12. The mobile terminal device according to claim 6, wherein each USB link control unit is connected to its respective HSIC physical layer circuit by a second bus.

13. The mobile terminal device according to claim 12, wherein the second bus conforms with UTMI standard or ULPI standard.

14. The mobile terminal device according to claim 7, wherein the IDLE state comprises one of the STROBE and DATA signal lines being in a high state and the other of the STROBE and DATA signal lines being in a low state;

the CONNECT state comprises the other of the STROBE and DATA signal lines being in the high state and the one of the STROBE and DATA signal lines being in the low state; and the RESET state comprises both of the STROBE and DATA signal lines being in the low state.

15. The semiconductor device according to claim 1, wherein the USB link control unit is connected to the HSIC physical layer circuit by a second bus.

16. The semiconductor device according to claim 15, wherein the second bus conforms with UTMI standard or ULPI standard.

17. The semiconductor device according to claim 2, wherein the IDLE state comprises one of the STROBE and DATA signal lines being in a high state and the other of the STROBE and DATA signal lines being in a low state;

the CONNECT state comprises the other of the STROBE and DATA signal lines being in the high state and the one of the STROBE and DATA signal lines being in the low state; and the RESET state comprises both of the STROBE and DATA signal lines being in the low state.

* * * * *